United States Patent
Nakamura et al.

(10) Patent No.: US 9,269,004 B2
(45) Date of Patent: Feb. 23, 2016

(54) INFORMATION PROCESSING TERMINAL, INFORMATION PROCESSING METHOD, AND PROGRAM

(71) Applicant: SONY CORPORATION, Tokyo (JP)

(72) Inventors: Takatoshi Nakamura, Kanagawa (JP); Atsushi Shionozaki, Tokyo (JP); Koshiro Mitsuya, Chiba (JP)

(73) Assignee: SONY CORPORATION, Tokyo (JP)

( * ) Notice: Subject to any disclaimer, the term of this patent is extended or adjusted under 35 U.S.C. 154(b) by 320 days.

(21) Appl. No.: 13/705,456

(22) Filed: Dec. 5, 2012

(65) Prior Publication Data

US 2013/0162674 A1 Jun. 27, 2013

(30) Foreign Application Priority Data

Dec. 26, 2011 (JP) ................................. 2011-283007

(51) Int. Cl.
*G06G 5/00* (2006.01)
*G06K 9/00* (2006.01)
*G06K 9/22* (2006.01)

(52) U.S. Cl.
CPC ............ *G06K 9/00671* (2013.01); *G06K 9/228* (2013.01)

(58) Field of Classification Search
CPC .......... H04N 13/0239; H04N 13/0452; H04N 5/225; H04N 5/445; H04N 5/228; H04N 5/76; H04N 5/222; H04N 5/50; G06F 3/013; G06F 2200/1637; G09G 2340/0492; G09G 5/00; G06K 9/228

USPC ......... 345/649, 619, 659, 650, 158, 672, 168, 345/474, 630, 647, 653, 661, 473, 173
See application file for complete search history.

(56) References Cited

U.S. PATENT DOCUMENTS 5,834,749 A * 11/1998 Durbin ......................... 235/454
8,384,770 B2 * 2/2013 Konno et al. .................... 348/51
2003/0052169 A1 * 3/2003 Tsikos ...................... G06K 9/26 235/454
2012/0306917 A1 * 12/2012 Sakurai et al. ................ 345/633

FOREIGN PATENT DOCUMENTS

JP 2011-204047 10/2011

* cited by examiner

*Primary Examiner* — Ke Xiao
*Assistant Examiner* — Gordon Liu
(74) *Attorney, Agent, or Firm* — Oblon, McClelland, Maier & Neustadt, L.L.P.

(57) ABSTRACT

An information processing terminal includes a recognition unit that recognizes an identifier projected over an image, an acquisition unit that acquires data of an object corresponding to the identifier, a processing unit that changes the orientation of the object according to the positional relationship between the information processing terminal itself and the identifier specified based on the image and, when it is no longer able to recognize the identifier, changes the orientation of the object according to the positional relationship between the information processing terminal itself and the identifier specified based on sensor data, and a display control unit that causes the object of which the orientation is changed according to the positional relationship between the information processing terminal itself and the identifier to be displayed over the image in a superimposed manner.

7 Claims, 16 Drawing Sheets

FIG. 17

(1) DeviceAttitude *currentAttitude = getDeviceAttitude();
(2) diffAttitude = multiplyByInverseOfAttitude(currentAttitude, referenceAttitude);
(3) RotationMatrix rotation = getRotationMatrix(diffAttitude);
    Matrix3d *matrix = getMatrix3dFromRotationMatrix(rotation);
(4) setObjectMatrix3d(matrix);

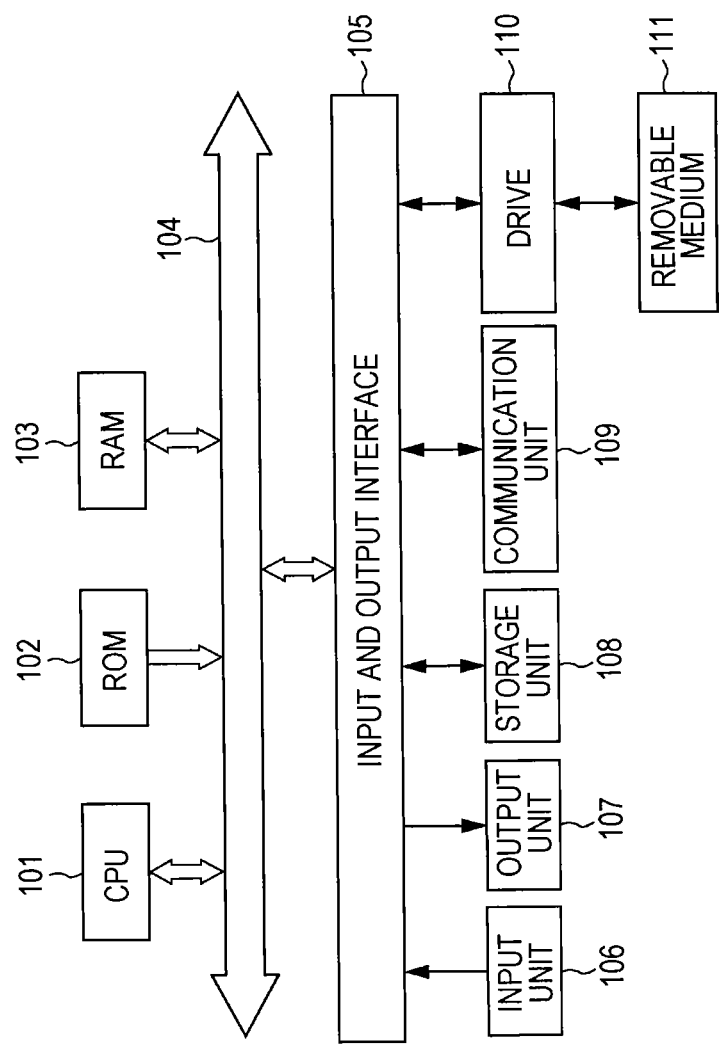

INFORMATION PROCESSING TERMINAL, INFORMATION PROCESSING METHOD, AND PROGRAM

BACKGROUND

The present disclosure relates to an information processing terminal, an information processing method, and a program, and particularly to an information processing terminal, an information processing method, and a program that enables continuous display of information corresponding to an identifier even when it is no longer able to recognize the identifier.

In recent years, attention has been paid to technologies pertaining to an extended sense of reality (or AR (Augmented Reality)). Among AR applications, there is one that recognizes an object in an image captured by a user using a so-called smartphone, or the like, and displays information on the recognized object in the captured image in a superimposed manner.

Capturing a two-dimensional marker printed on an advertising poster for a product, for example, a user can find details of the product from superimposed information displayed over an image of the poster on a display. Such a two-dimensional marker indicates predetermined information with a pattern having a white region and a black region. By encoding the information that it is desired to show, a pattern with a white region and a black region is decided upon. Japanese Unexamined Patent Application Publication No. 2011-204047 is an example of the above-described related art.

SUMMARY

In a marker type AR application that displays information by recognizing a two-dimensional marker, it is of course necessary for the two-dimensional marker to be projected over a captured image.

Thus, when information corresponding to a two-dimensional marker is continuously displayed while the two-dimensional marker is recognized, for example, if the two-dimensional marker that has been projected for the time being is deviated from the image, the recognition of the two-dimensional marker is halted, and the display of the information ends.

It is desirable to enable the continuous display of information corresponding to an identifier even when it is no longer able to recognize the identifier.

According to an embodiment of the present disclosure, there is provided an information processing terminal which includes a recognition unit that recognizes an identifier projected over an image, an acquisition unit that acquires data of an object corresponding to the identifier, a processing unit that changes the orientation of the object according to the positional relationship between the information processing terminal itself and the identifier specified based on the image, and when it is no longer able to recognize the identifier, changes the orientation of the object according to the positional relationship between the information processing terminal itself and the identifier specified based on sensor data, and a display control unit that causes the object of which the orientation is changed, according to the positional relationship between the information processing terminal itself and the identifier, to be displayed over the image in a superimposed manner. Not only the orientation of the object but also the display size thereof can be changed.

A capturing unit can be further provided. In this case, the recognition unit may recognize the identifier projected over the image captured by the capturing unit.

When it is no longer able to recognize the identifier, the processing unit may change the orientation of the object according to the positional relationship between the information processing terminal itself and the identifier specified based on the sensor data detected at the time when and after the identifier can be last recognized.

A sensor unit that detects the sensor data can be further provided.

The sensor unit may include a gyro sensor.

The identifier may be a two-dimensional code including regions with different colors.

According to another embodiment of the present disclosure, there is provided an information processing method including an identifier projected over an image is recognized and data of an object corresponding to the identifier is acquired. In addition, processes are performed which change the orientation of the object according to the positional relationship between the information processing terminal itself and the identifier specified based on the image, and when it is no longer able to recognize the identifier, changes the orientation of the object according to the positional relationship between the information processing terminal itself and the identifier specified based on sensor data, and the object of which the orientation is changed according to the positional relationship between the information processing terminal itself and the identifier is displayed over the image in a superimposed manner.

According to the present disclosure, it is possible to continuously display information corresponding to an identifier even when it is no longer able to recognize the identifier.

BRIEF DESCRIPTION OF THE DRAWINGS

FIG. 17 is a diagram illustrating calculation of a rotation matrix based on sensor data according to an embodiment of the present disclosure; and FIG. 18 is a block diagram showing a configuration example of a computer according to an embodiment of the present disclosure.

DETAILED DESCRIPTION OF EMBODIMENTS

Exterior Configuration of Information Processing Terminal

Figure 1:
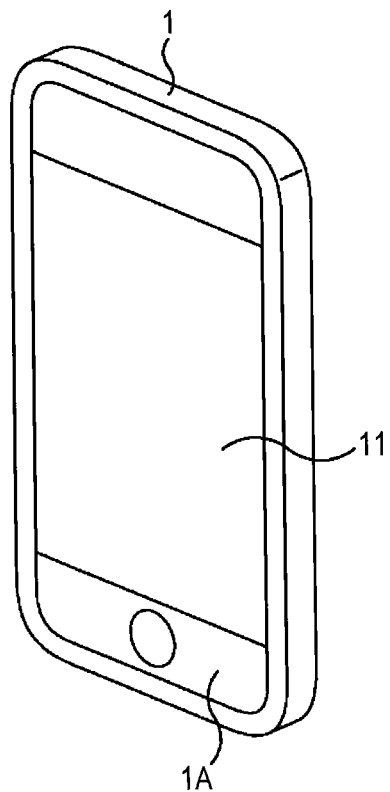
FIG. 1 is a diagram showing a configuration example of the front side of an information processing terminal according to an embodiment of the present disclosure.

FIG. 1 is a diagram showing an example of the exterior of an information processing terminal according to an embodiment of the present disclosure.

The information processing terminal 1 is a mobile terminal such as a so-called smartphone in a housing of which the size is large enough to be held by a user in one hand. On the front face 1A of the housing of the information processing terminal 1, a display unit 11 including an LCD (Liquid Crystal Display), or the like is provided. On the display unit 11, a touch panel is laminated, and users can perform various kinds of operations by directly touching buttons, or the like displayed on the display unit 11 with a finger.

Figure 2:
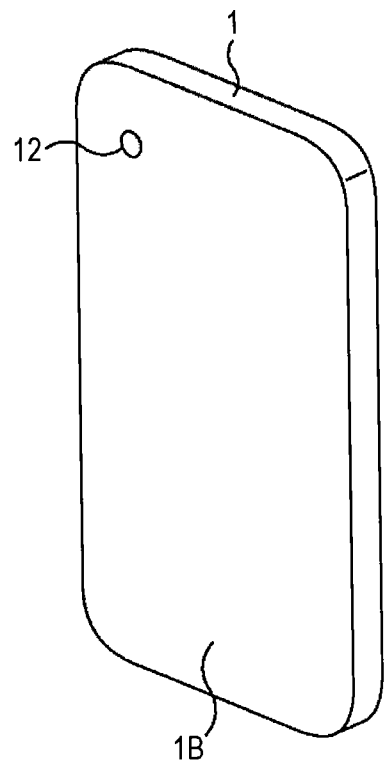
FIG. 2 is a diagram showing a configuration example of the back side of an information processing terminal according to an embodiment of the present disclosure.

On the back face 1B of the housing of the information processing terminal 1, a camera 12 is provided as shown in FIG. 2. An image taken by the camera 12 (captured image) is displayed on the display unit 11 in real-time. Users view the display on the display unit 11 and then can recognize an object in the captured image.

The information processing terminal 1 having the exterior configuration as above is equipped with a function of recognizing two-dimensional markers. When a two-dimensional marker in a captured image is recognized, the information processing terminal 1 acquires information corresponding to the recognized two-dimensional marker, and displays the acquired image over the captured image in a superimposed manner.

As described later, data of a 3D object is acquired through the Internet, or the like as information corresponding to a two-dimensional marker, and then displayed over a captured image in a superimposed manner. The orientation and position of the 3D object change based on the positional relationship between the two-dimensional marker and the information processing terminal 1.

Example of Two-Dimensional Marker

Figure 3:
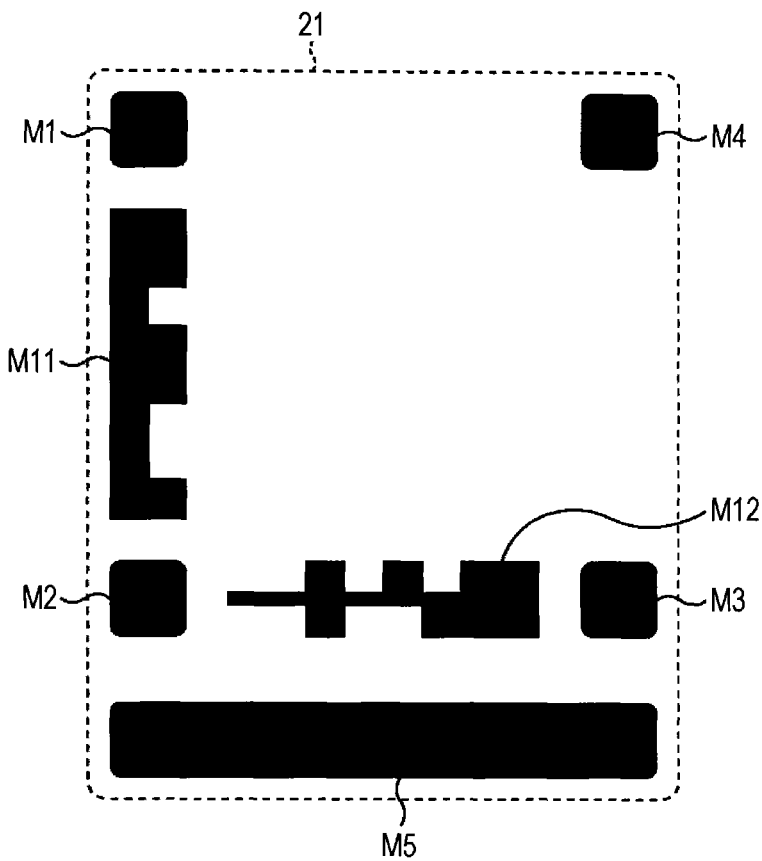
FIG. 3 is a diagram showing an example of a two-dimensional marker according to an embodiment of the present disclosure.

FIG. 3 is a diagram showing an example of a two-dimensional marker.

A two-dimensional marker 21 is configured such that white regions and black regions are arranged in the range indicated by a dashed line. A mark M1 that is a black region having a substantially square shape indicates the upper left corner of the two-dimensional marker 21 and a mark M2 indicates the lower left corner of the two-dimensional marker 21. A mark M3 indicates the lower right corner of the two-dimensional marker 21, and a mark M4 indicates the upper right corner of the two-dimensional marker 21. A mark M5, which is arranged below the mark M2 and the mark M3 and has a rectangular shape of which the length in the longitudinal direction is substantially the same as that of the two-dimensional marker 21 in the right-left direction, indicates the reference of the orientation of the two-dimensional marker 21.

When the two-dimensional marker 21 is projected onto the captured image, the information processing terminal 1 can specify the scope of the two-dimensional marker 21 in the real space from the positions of the marks M1 to M4. In addition, the information processing terminal 1 can specify the orientation of the two-dimensional marker 21 in the real space from the position of the mark M5.

The shape of a mark M11 arranged between the mark M1 and the mark M2 and the shape of a mark M12 arranged between the mark M2 and the mark M3 indicate identification information. The information processing terminal 1 recognizes the shape of the mark M11 and the shape of the mark M12, and acquires data of a 3D object corresponding to the identification information indicated by the recognized shapes as information corresponding to the two-dimensional marker 21. An expression method of identification information using the two-dimensional marker 21 is not limited to the method using the shape of mark M12, other methods may be used. In addition, when only a specific 3D object is to be displayed, identification information is not necessary.

Display Example of 3D Object

Figure 4:
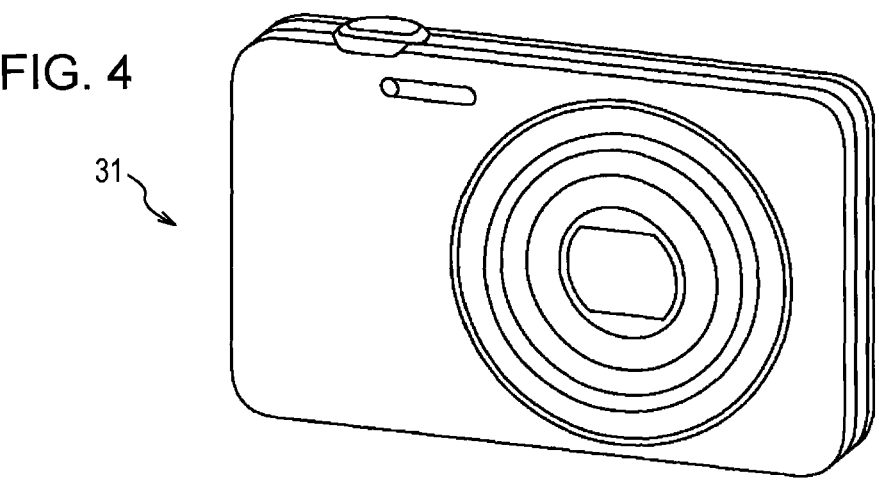
FIG. 4 is a diagram showing an example of a 3D object according to an embodiment of the present disclosure.

FIG. 4 is a diagram showing an example of a 3D object.

An object 31 shown in FIG. 4 is a 3D object having the exterior of a digital still camera. In the information processing terminal 1, data of the exterior of the digital still camera of FIG. 4 as viewed from different angles is acquired through the Internet, or the like, and prepared as the data of the object 31. A lens, and the like are provided on the front face of the object 31, and a shutter button is provided on the upper face.

When a user directs the camera 12 of the information processing terminal 1 toward the two-dimensional marker 21 of FIG. 3, the two-dimensional marker 21 projected on a captured image is recognized by the information processing terminal 1. On the display unit 11 of the information processing terminal 1, the object 31 of FIG. 4 is displayed over the captured image in a superimposed manner.

Figure 5:
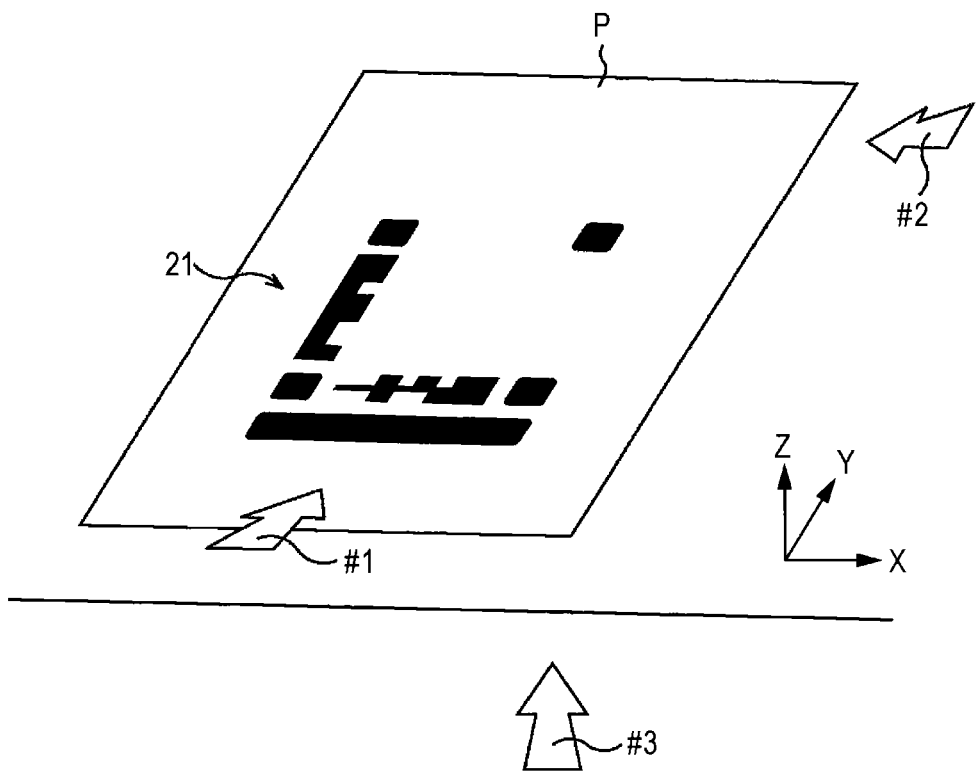
FIG. 5 is a perspective view showing a real space in which a paper printed with a two-dimensional marker is placed according to an embodiment of the present disclosure.

FIG. 5 is a perspective view showing a real space in which a paper printed with the two-dimensional marker 21 is placed.

The two-dimensional marker 21 is printed on paper P placed on the horizontal plane of a desk, or the like so that the sides of the mark M5 in the longitudinal direction are substantially parallel with the lower side of the paper P. The user directs the camera 12 toward the two-dimensional marker 21 prepared in the state so as to cause the information processing terminal 1 to recognize the two-dimensional marker 21.

Hereinbelow, description will be provided by appropriately setting the right-left direction of FIG. 5 to be an X-axis direction (the right direction to be + and the left direction to be −), the direction from the lower left side to the upper right side to be a Y-axis direction (the upper right direction to be + and the lower left direction to be −), and the upward-downward direction to be a Z-axis direction (the upward direction to be + and the downward direction to be −). Having the position of the camera 12 as a reference, the direction of the white arrow #1 is the direction of viewing the two-dimensional marker 21 from the upper side obliquely to the +Y direction, and the direction of the white arrow #2 is the direction of viewing the two-dimensional marker 21 from the upper side obliquely to the −X direction, FIG. 6 is a diagram showing a display example of the display unit 11 when the two-dimensional marker 21 of FIG. 5 is recognized.

Figure 6:
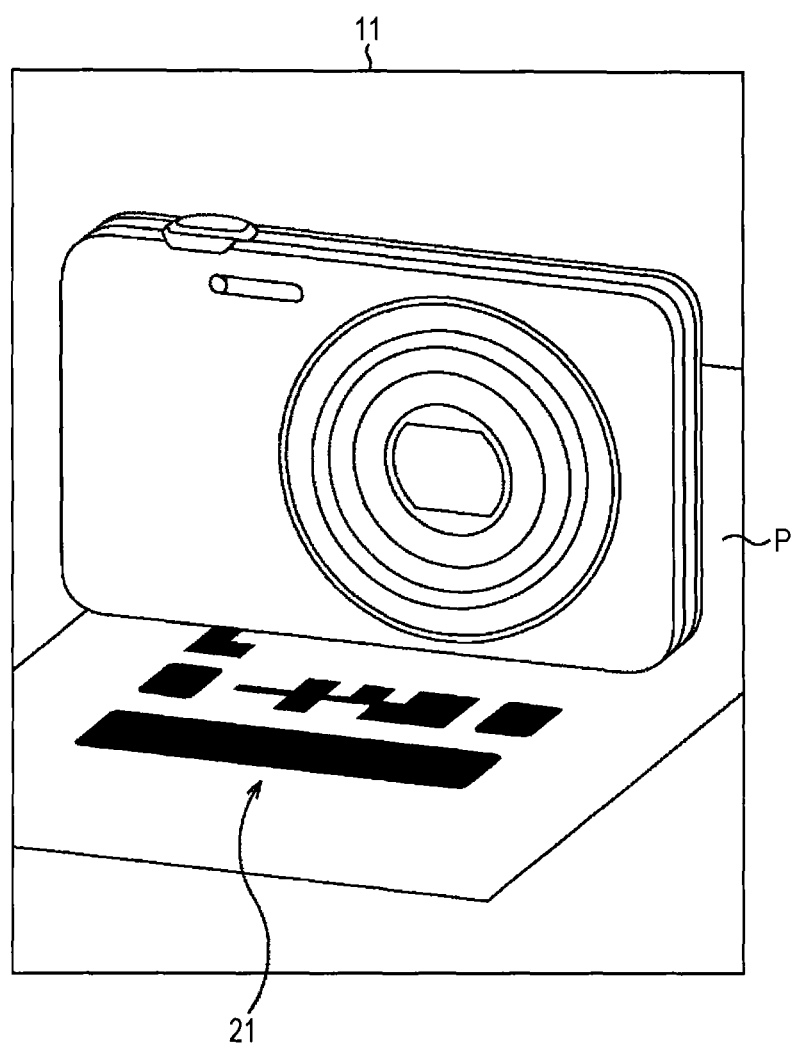
FIG. 6 is a diagram showing a display example of a display unit according to an embodiment of the present disclosure.

FIG. 6 shows a display example when capturing is performed in the state in which the camera 12 faces the direction of the white arrow #3 of FIG. 5 so that the two-dimensional marker 21 is disposed substantially at the center of the display unit 11. Upon recognition of the two-dimensional marker 21, the object 31 is displayed close to the position in which the two-dimensional marker 21 is projected on the captured image as if the object slightly floats over the two-dimensional marker 21 in the real space.

With regard to the orientation of the object 31, the front face on which the lens, and the like are provided is set to face the mark M5. The object 31 is displayed in the state in which the front face faces the mark M5 at all times. Accordingly, by capturing the two-dimensional marker 21 in the state shown in FIG. 5, the user can view the front face of the digital still camera indicated as the object 31 from an upper position that is slightly oblique to the right side.

Figure 7:
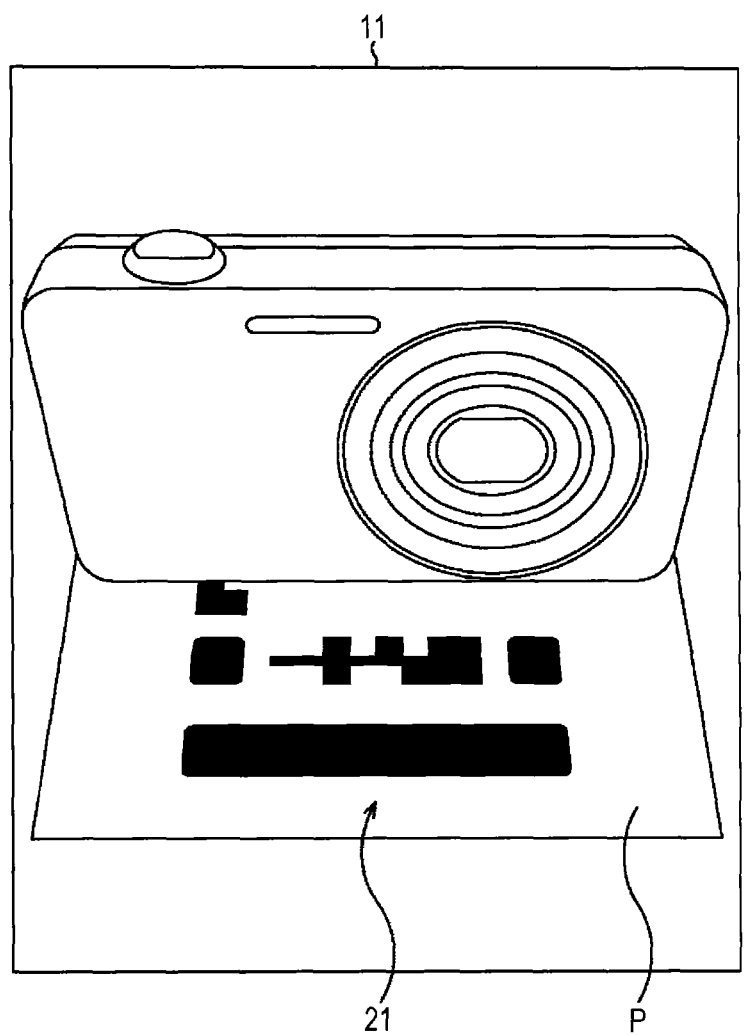
FIG. 7 is a diagram showing another display example of the display unit according to an embodiment of the present disclosure.

FIG. 7 shows another display example when capturing is performed in the state in which the camera 12 faces the direction of the white arrow #1 of FIG. 5 so that the two-dimensional marker 21 is disposed substantially at the center of the display unit 11. In this example, substantially the front face of the digital still camera as the object 31 displayed over the captured image in a superimposed manner is viewed from an oblique upper position.

Figure 8:
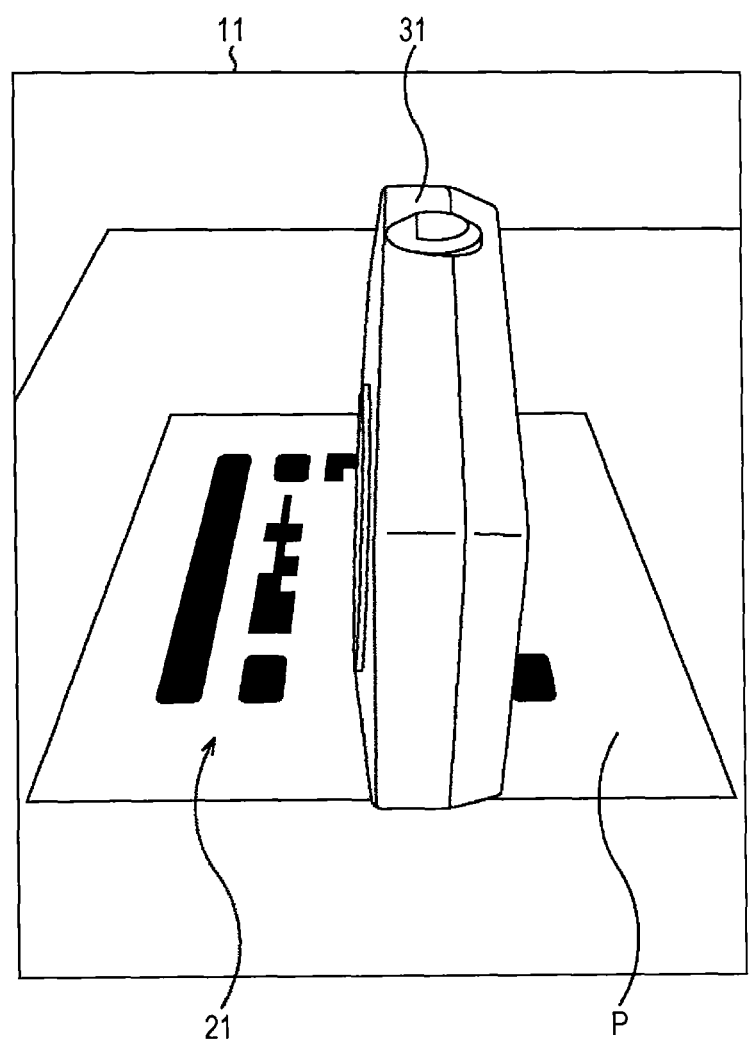
FIG. 8 is a diagram showing still another display example of the display unit according to an embodiment of the present disclosure.

FIG. 8 shows another display example when capturing is performed in the state in which the camera 12 faces the direction of the white arrow #2 of FIG. 5 so that the two-dimensional marker 21 is disposed substantially at the center of the display unit 11. In this example, the right side face of the digital still camera as the object 31 displayed over the captured image in a superimposed manner is viewed from an oblique upper position.

As above, data when the digital still camera is viewed from various positions is prepared in the information processing terminal 1, and the orientation and the position of the object 31 displayed over the captured image in a superimposed manner changes according to the positional relationship between the information processing terminal 1 and the two-dimensional marker 21.

By changing capturing positions and then capturing the two-dimensional marker 21 printed on the paper P from various positions, the user can view the exterior of the digital still camera in accordance with the positions. Although not shown in the drawings, for example, by capturing the two-dimensional marker 21 so that the mark M5 is placed on the rear side and the mark M1 and the mark M4 are placed on the front side, the user can view the back face of the digital still camera.

The displays of the object 31 as shown in FIGS. 6 to 8 continue in real-time while the two-dimensional marker 21 is recognized. When capturing of a captured image is performed by changing positions so that the two-dimensional marker 21 is not deviated from the capturing range, the object 31 viewed from different directions is sequentially displayed according to the orientation of the two-dimensional marker 21 projected on the captured image.

In addition, the display of the object 31 continues based on the positional relationship between the information processing terminal 1 and the two-dimensional marker 21 estimated using sensor data of the gyro sensor, or the like even after it is no longer able to recognize the two-dimensional marker 21. The information processing terminal 1 is provided with a sensor such as a gyro sensor.

Figure 9:
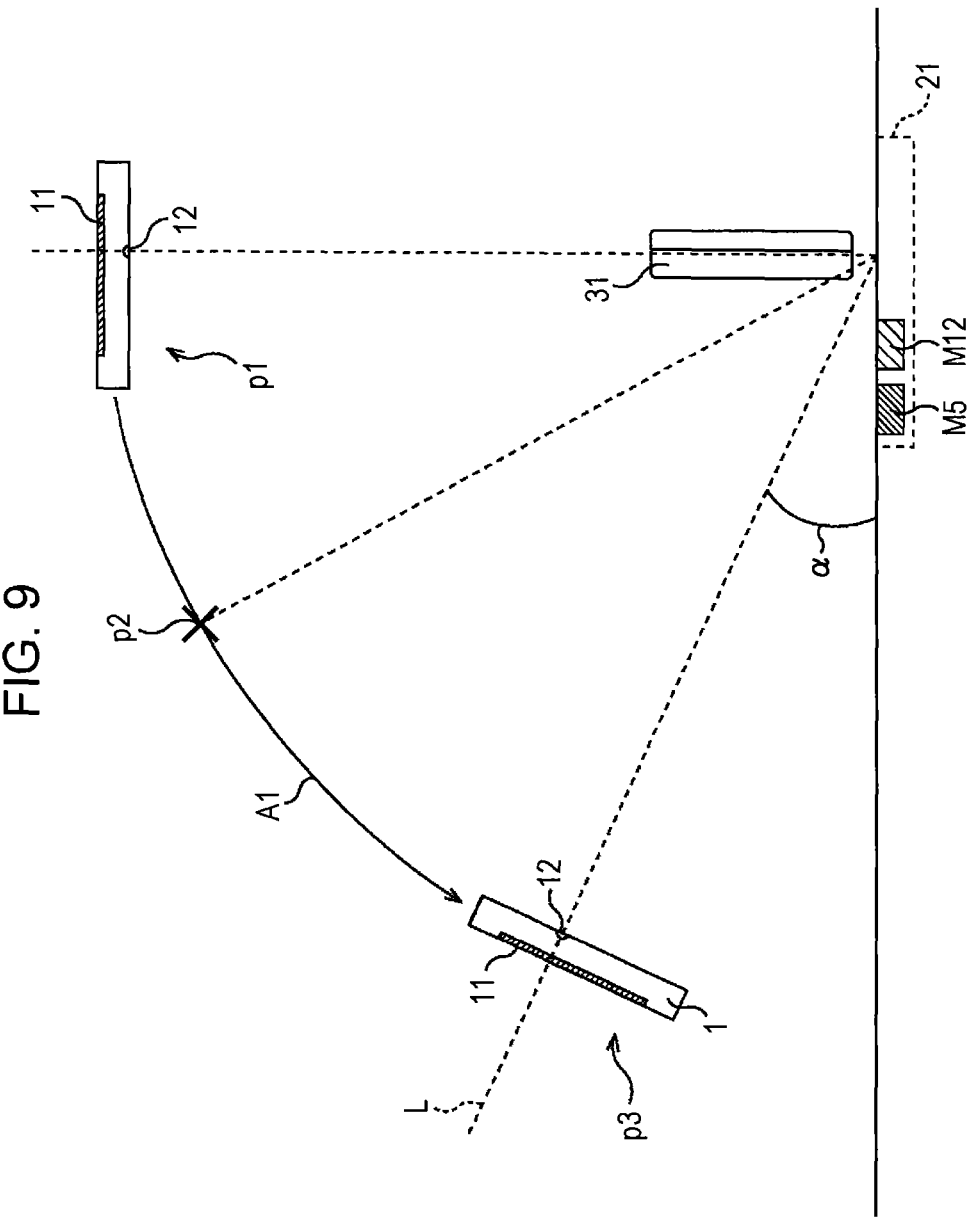
FIG. 9 is a diagram illustrating the positional relationship between an information processing terminal and a two-dimensional marker according to an embodiment of the present disclosure.

FIG. 9 is a diagram illustrating the positional relationship between the information processing terminal 1 and the two-dimensional marker 21. FIG. 9 is a cross-sectional view taken by viewing the environment of FIG. 5 in the −X direction from the same height as that of the upper face of the desk.

When the information processing terminal 1 is placed at a position p1 that is a position at which the two-dimensional marker 21 can be captured from the right front side thereof, for example, on the display unit 11, the object 31 in the state of being viewed from the right upper side is displayed over a captured image in a superimposed manner. The position p1 is a position at which the optical axis L of the camera 12 is parallel with the perpendicular line of the plane of the two-dimensional marker 21 (the horizontal plane on which the paper P printed with the two-dimensional marker 21 is placed). The object 31 shown in FIG. 9 is not in a real space, but shown in order to describe the ways of viewing the object from the information processing terminal 1.

A case will be described in which the position of the information processing terminal 1 is brought close to the horizontal plane from the position p1 as indicated by the arrow A1 with the camera 12 fixed to face the two-dimensional marker 21 and the fixed distance between itself and the two-dimensional marker 21. In this case, the visibility of the object 31 changes so that the front face of the object 31 is gradually shown according to the positional relationship between the two-dimensional marker 21 and the information processing terminal 1 specified from the captured image. When the camera 12 is at a position p2, the object 31 is displayed as viewed in FIG. 7 on the display unit 11.

When the information processing terminal 1 is brought close to the horizontal plane, and the position thereof exceeds a position p3, the information processing terminal 1 is not able to recognize the two-dimensional marker 21 projected on the captured image. The position p3 is a position at which the angle formed by the optical axis L of the camera 12 and the horizontal plane is an angle α. As skewness of the two-dimensional marker 21 projected on the captured image increases, the position p3 is a limit position at which the two-dimensional marker 21 can be recognized.

When the terminal exceeds the position p3, the information processing terminal 1 specifies the change of its own position after the time when the two-dimensional marker 21 can be finally recognized based on sensor data, and continues display of the object 31 according to the positional relationship between the information processing terminal 1 at the current position and the two-dimensional marker 21.

Figure 10:
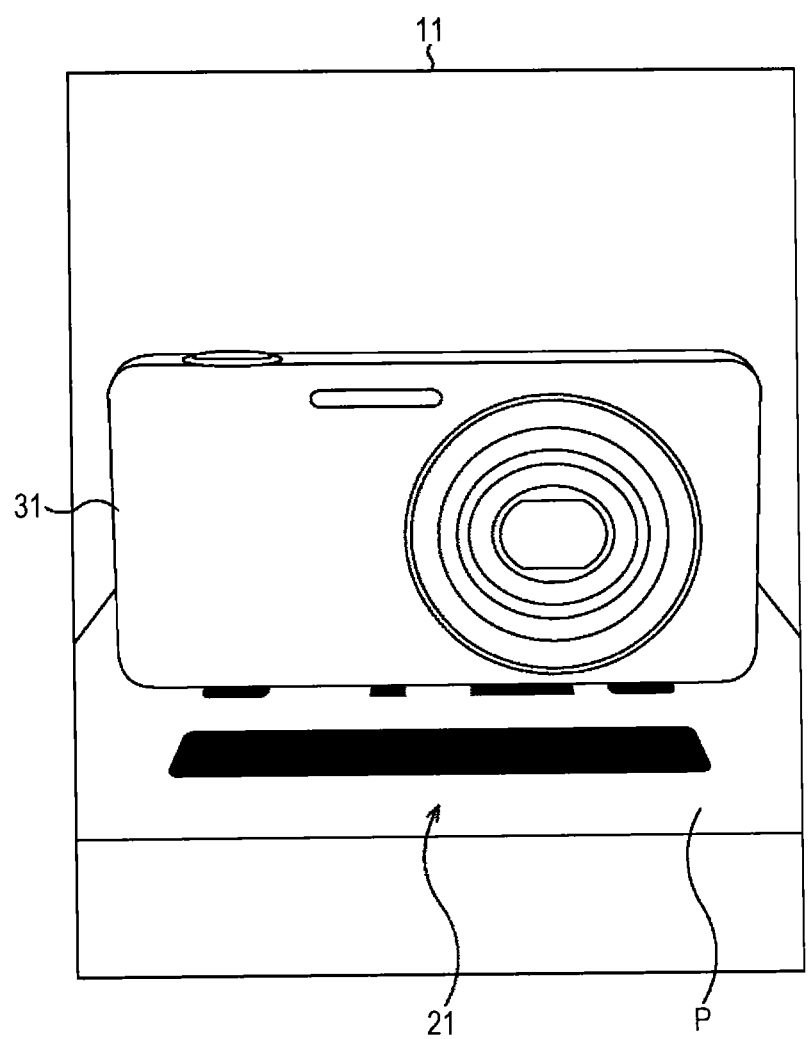
FIG. 10 is a diagram showing a display example of the display unit according to an embodiment of the present disclosure.

FIG. 10 is a diagram showing a display example of the display unit 11 when the position of the information processing terminal 1 is at a position lower than the position p3. In this case, substantially the right front side of the digital still camera as the object 31 displayed over the captured image in a superimposed manner is viewed from a lower position than the position of FIG. 7.

In this manner, the information processing terminal 1 can display the object 31 in a state of being viewed from a position lower than the position p3 that is the recognition limit position of the two-dimensional marker 21. In other words, a measured value of a sensor such as a gyro sensor, or the like is used in the correction of the positional relationship between the information processing terminal 1 and the two-dimensional marker 21 specified based on the captured image and thereby display of the object 31 continues.

A series of processes of the information processing terminal 1 for displaying the object 31 in the above manner will be described later referring to flowcharts.

Configuration Example of Information Processing Terminal 1

Figure 11:
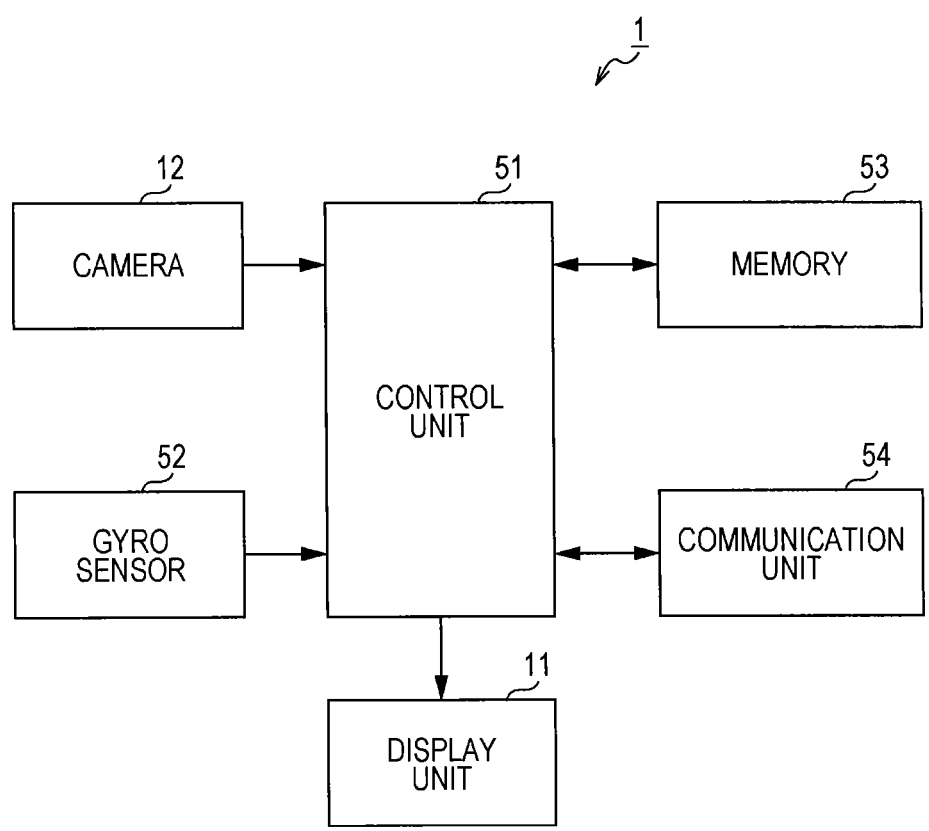
FIG. 11 is a diagram showing a hardware configuration example of an information processing terminal according to an embodiment of the present disclosure.

FIG. 11 is a diagram showing a hardware configuration example of the information processing terminal 1.

The information processing terminal 1 is provided with a control unit 51, a gyro sensor 52, a memory 53, and a communication unit 54, in addition to the display unit 11 and the camera 12 described above.

The control unit 51 causes a program stored in the memory 53, or the like to be executed, and controls overall operations of the information processing terminal 1. For example, when the two-dimensional marker 21 projected on a captured image supplied from the camera 12 can be recognized, the control unit 51 acquires data of a 3D object corresponding to recognition information expressed by the two-dimensional marker 21. The control unit 51 specifies the positional relationship between the information processing terminal 1 and the two-dimensional marker 21 based on the captured image, and causes to the display unit 11 to display the 3D object of which the orientation and the position are changed according to the specified relationship over the captured image in a superimposed manner.

In addition, when it is no longer able to recognize the two-dimensional marker 21, the control unit 51 specifies the positional relationship between the two-dimensional marker 21 and the information processing terminal 1 at a current position based on an output of the gyro sensor 52 with reference to the state in which the two-dimensional marker 21 could be last recognized. The control unit 51 changes the orientation and the position of the 3D object according to the positional relationship between the information processing terminal 1 and the two-dimensional marker 21 and continues to cause the display unit 11 to display the 3D object over the captured image in a superimposed manner even after it is no longer able to recognize the two-dimensional marker 21.

Figure 12:
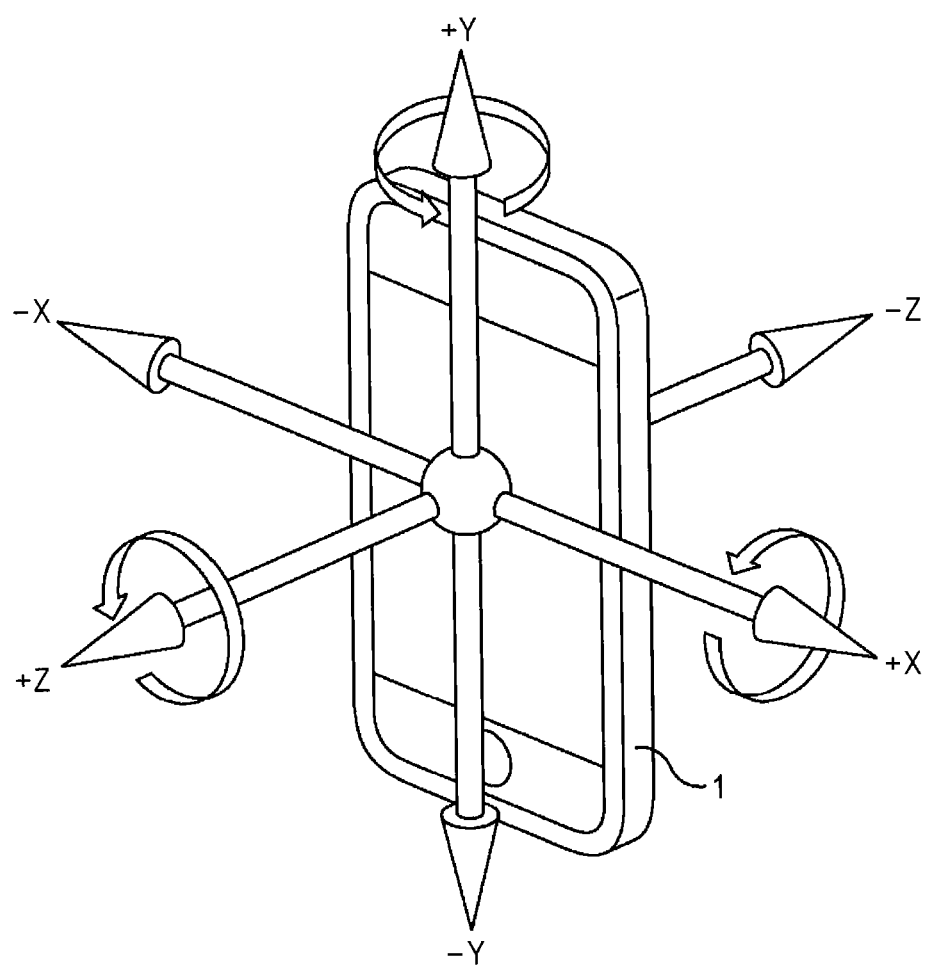
FIG. 12 is a diagram illustrating angular velocity measured by a gyro sensor according to an embodiment of the present disclosure.

The gyro sensor 52 measures angular velocity occurring around each axis of the X axis, the Y axis, and the Z axis, as illustrated in FIG. 12 and outputs the measured values to the control unit 51 as sensor data.

The memory 53 includes a flash memory, or the like, and stores a program executed by the control unit 51 and data of the 3D object transmitted from a server on the Internet. The data stored in the memory 53 is appropriately read by the control unit 51.

The communication unit 54 performs communication with an external device following control by the control unit 51. For example, the communication unit 54 performs communication with a server through the Internet, and requests transmission of the data of the 3D object corresponding to recognition information expressed by the two-dimensional marker 21. The communication unit 54 receives the data transmitted from the server according to the request, and outputs the data to the control unit 51. The data output to the control unit 51 used in display of the display unit 11 and supplied to the memory 53 to be retained.

Figure 13:
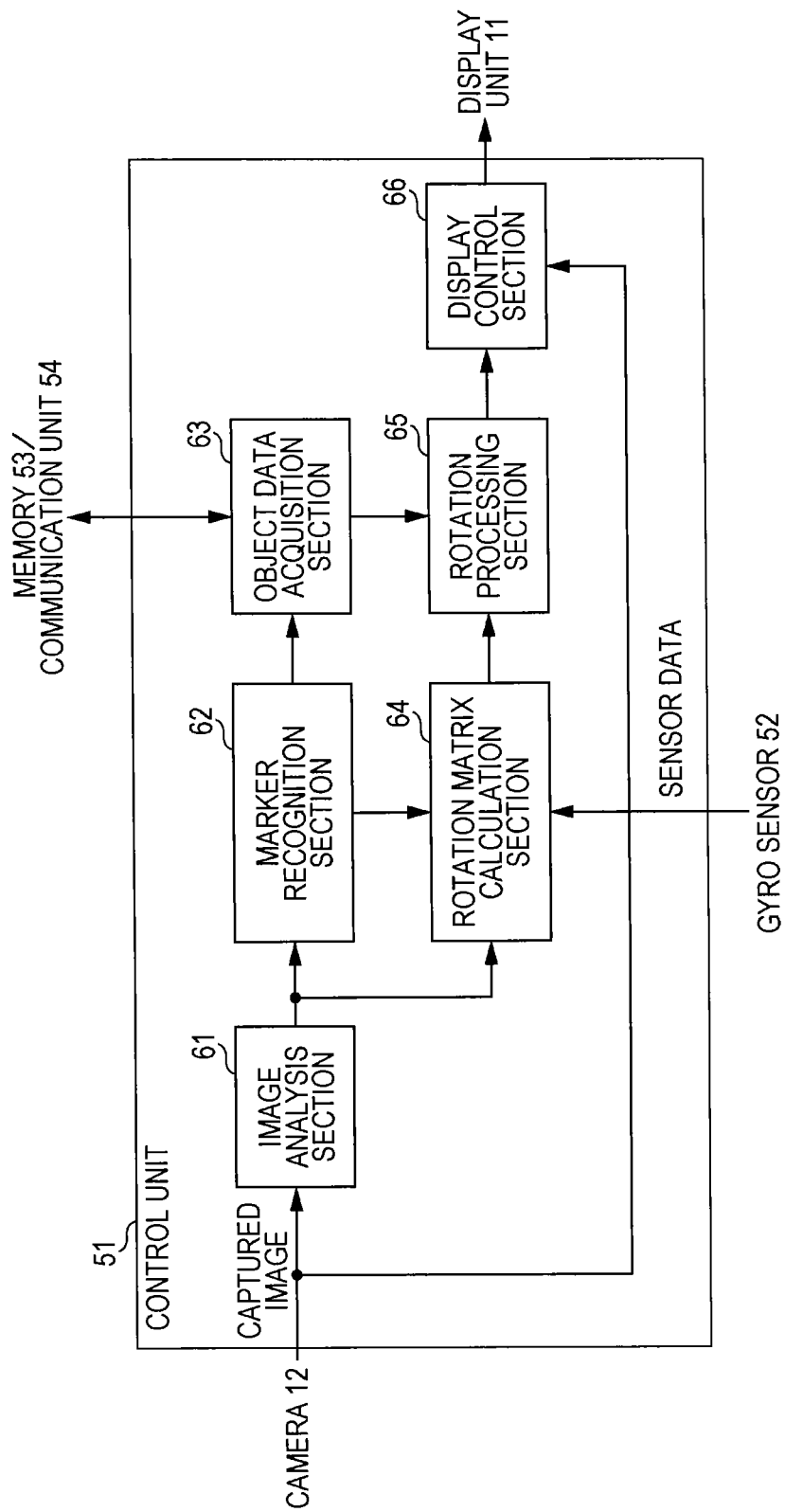
FIG. 13 is a block diagram showing a function configuration example of a control unit according to an embodiment of the present disclosure.

FIG. 13 is a block diagram showing a function configuration example of the control unit 51. At least a part of the functional sections shown in FIG. 13 is realized by the control unit 51 of FIG. 11 executing a predetermined program.

In the control unit 51, an image analysis section 61, a marker recognition section 62, an object data acquisition section 63, a rotation matrix calculation section 64, a rotation processing section 65, and a display control section 66 are realized. The captured image taken by the camera 12 is input to the image analysis section 61 and the display control section 66.

The image analysis section 61 analyzes the captured image and acquires the position of the two-dimensional marker 21. In the information of the position of the two-dimensional marker 21 acquired by the image analysis section 61, information pertaining to the positions of respective black regions constituting the two-dimensional marker 21 is included. The information of the position of the two-dimensional marker 21 acquired by the image analysis section 61 is supplied to the marker recognition section 62 and the rotation matrix calculation section 64 as an analysis result of the captured image.

The marker recognition section 62 recognizes the two-dimensional marker 21 based on the analysis result of the image analysis section 61. When the two-dimensional marker 21 can be recognized, the marker recognition section 62 outputs information indicating the recognition to the rotation matrix calculation section 64, and outputs recognition information expressed by the two-dimensional marker 21 to the object data acquisition section 63. In addition, when it is no longer able to recognize the two-dimensional marker 21, the marker recognition section 62 outputs information indicating the non-recognition to the rotation matrix calculation section 64.

The object data acquisition section 63 acquires data of the 3D object corresponding to the recognition information supplied from the marker recognition section 62 by reading the data from the memory 53 or by performing communication with the server by controlling the communication unit 54. The object data acquisition section 63 outputs the acquired data of the 3D object to the rotation processing section 65.

When the marker recognition section 62 recognizes the two-dimensional marker 21, the rotation matrix calculation section 64 calculates a rotation matrix indicating the rotation amount of the orientation and the conversion amount of the position of the 3D object to be displayed over the captured image in a superimposed manner based on the analysis result of the image analysis section 61. The rotation matrix obtained when the marker recognition section 62 recognizes the two-dimensional marker 21 is based on the positional relationship between the information processing terminal 1 and the two-dimensional marker 21 specified based on the captured image. The calculation of the rotation matrix will be described later.

In addition, when it is no longer able to recognize the two-dimensional marker 21, the rotation matrix calculation section 64 calculates a rotation matrix based on sensor data supplied from the gyro sensor 52. The rotation matrix obtained when it is no longer able to recognize the two-dimensional marker 21 is based on the positional relationship between the two-dimensional marker 21 and the information processing terminal 1 at a current position specified based on the sensor data.

The rotation matrix calculation section 64 outputs the rotation matrix obtained from the calculation to the rotation processing section 65.

The rotation processing section 65 applies the rotation matrix obtained from the rotation matrix calculation section 64 to the 3D object expressed by the data supplied from the object data acquisition section 63, and outputs the data of the 3D object after the application of the rotation matrix to the display control section 66. By applying the rotation matrix, the orientation and the position of the 3D object changes according to the positional relationship between the information processing terminal 1 and the two-dimensional marker 21.

The display control section 66 causes the display unit 11 to display the 3D object that has undergone the application of the rotation matrix supplied from the rotation processing section 65 over the captured image in a superimposed manner.

Operation of Information Processing Terminal 1

Herein, a display process of the 3D object by the information processing terminal 1 will be described with reference to the flowchart of FIG. 14.

Figure 14:
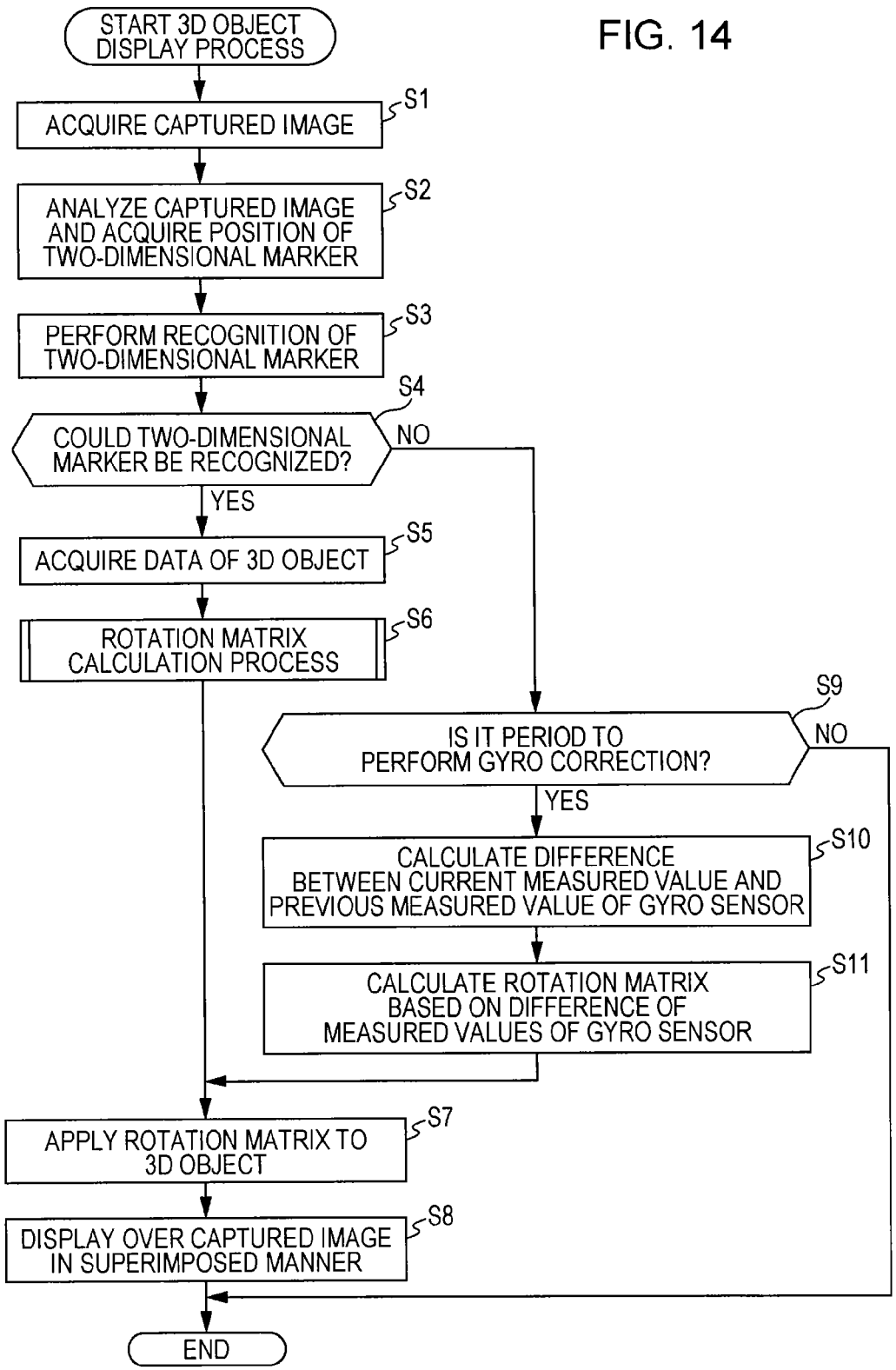
FIG. 14 is a flowchart for describing a 3D object display process by an information processing terminal according to an embodiment of the present disclosure.

The process of FIG. 14 starts after activation of an application having a recognition function of the two-dimensional marker 21 is instructed, for example, from the menu screen displayed on the display unit 11. When the application is activated, taking a captured image by the camera 12 starts. Angular velocities are repeatedly measured in the gyro sensor 52 at predetermined intervals.

In Step S1, the camera 12 acquires the captured image.

In Step S2, the image analysis section 61 analyzes the captured image acquired by the camera 12, and acquires the position of the two-dimensional marker 21.

In Step S3, the marker recognition section 62 recognizes the two-dimensional marker 21 based on the analysis result of the image analysis section 61.

In Step S4, the marker recognition section 62 determines whether the two-dimensional marker 21 could be recognized or not.

When it is determined that the two-dimensional marker 21 could be recognized in Step S4, the object data acquisition section 63 acquires data of the 3D object corresponding to identification information expressed by the two-dimensional marker 21 in Step S5. When the two-dimensional marker 21 could be recognized, the marker recognition section 62 supplies the identification information that is the recognition result of the two-dimensional marker 21 to the object data acquisition section 63.

In Step S6, the rotation matrix calculation section 64 performs a rotation matrix calculation process. The rotation matrix calculation process will be described later with reference to the flowchart of FIG. 15. From the rotation matrix calculation process, a matrix used in the rotation of the orientation and the conversion of the position of the 3D object is obtained from the rotation matrix calculation section 64.

In Step S7, the rotation processing section 65 applies the rotation matrix obtained from the rotation matrix calculation process to the 3D object expressed by the data supplied from the object data acquisition section 63.

In Step S8, the display control section 66 causes the display unit 11 to display the 3D object that has undergone the application of the rotation matrix over the captured image in a superimposed manner.

On the other hand, when it is determined that it was not able to recognize the two-dimensional marker 21 in Step S4, the rotation matrix calculation section 64 determines whether or not it is a period in which the positional relationship between the gyro correction is to be performed in Step S9, in other words, whether or not the positional relationship between information processing terminal 1 and the two-dimensional marker 21 is to be corrected based on an output of the gyro sensor 52. For example, the period within a predetermined time from a time point in which the two-dimensional marker 21 could be last recognized, or the period to the time when an angular velocity equal to or higher than a predetermined value is measured is set as the period for performing the gyro correction.

When it is determined that the period is within the period for performing the gyro correction in Step S9, the rotation matrix calculation section 64 calculates the difference between the current measured value and the previous measured value of the gyro sensor 52 in Step S10.

The rotation matrix calculation section 64 calculates a rotation matrix based on the difference obtained from the calculation in Step S11. The rotation matrix obtained herein is set to express the rotation amount of the orientation and the conversion amount of the position of the 3D object according to the positional relationship between the two-dimensional marker 21 and the information processing terminal 1 at the current position, which is estimated from a change in the position of the information processing terminal 1 indicated by the difference of the measured values of the gyro sensor 52. The axis of the rotation of the 3D object may be fixed to one at which the two-dimensional marker 21 could be last recognized.

After the rotation matrix is obtained based on the difference between the current measured value and the previous measured value of the gyro sensor 52, processes of Step S7 and thereafter are performed. In other words, the rotation matrix obtained based on the difference between the current measured value and the previous measured value is applied to the 3D object, and the 3D object that has undergone the application of the rotation matrix is displayed over the captured image in a superimposed manner.

After the 3D object that has undergone the application of the rotation matrix is displayed over the captured image in a superimposed manner in Step S8, or when it is determined that the period is not within the period for performing the gyro correction in Step S9, the process ends.

The above process is repeated every time a captured image is acquired, and the display of the object 31 as described with reference to FIGS. 6 to 8 and 9 is realized. Even when a user moves the position of the camera 12 lower than the position p3 that is the recognition limit position of the two-dimensional marker 21 on the captured image, the object 31 in the state as viewed from the position can be displayed and recognized.

Figure 15:
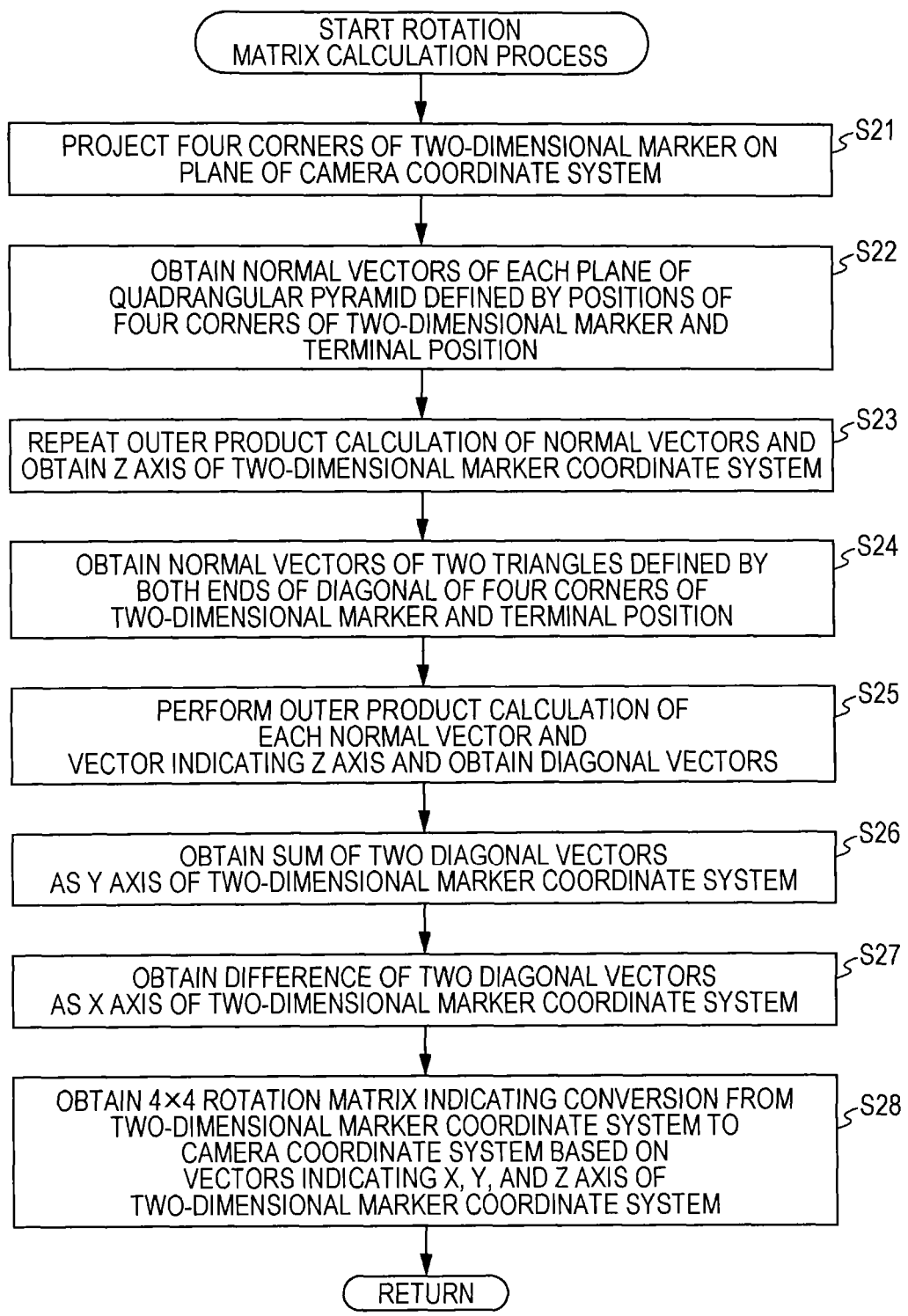
FIG. 15 is a flowchart for describing a rotation matrix calculation process performed in Step S6 of FIG. 14 according to an embodiment of the present disclosure.

Next, the rotation matrix calculation process performed in Step S6 of FIG. 14 will be described with reference to the flowchart of FIG. 15.

The rotation matrix calculation process is a process of calculating a 4×4 matrix for converting a marker coordinate system that is the coordinate system of the two-dimensional marker 21 in a three-dimensional space (real space) into a camera coordinate system that is the coordinate system of the information processing terminal 1 in the same three-dimensional space.

Herein, it is assumed that the coordinate of the center position in the captured image with the marks M1 to M4 indicating the four corners of the two-dimensional marker 21 is specified based on an analysis result from the image analysis section 61.

In addition, the camera coordinate system which serves as the conversion target is set to a coordinate system expressed by setting the right direction of the captured image to be the +X direction, the lower direction thereof to be the +Y direction, and the depth direction thereof to be the +Z direction. The origin is the position of the camera 12.

Furthermore, the marker coordinate system which serves as the conversion source is set to a coordinate system expressed, having the orientation of FIG. 3 as a reference, by setting the right direction of the two-dimensional marker 21 to be the +X direction, the lower direction thereof to be the +Y direction, and the direction from the surface thereof to the back face to be the +Z direction. The original point is the center of the two-dimensional marker 21. The size of the two-dimensional marker 21 is expressed by a length of 1×1.

The two-dimensional coordinates of the captured image are set to be coordinates expressed by the right direction set to be the +X direction and the lower direction set to be the +Y direction. The center position of the captured image is set to be the original point.

The position of the camera in the three-dimensional space is set to 0. In addition, the mark M1 in the upper left corner, the mark M2 in the lower left corner, the mark M3 in the lower right corner, and the mark M4 in the upper right corner of the two-dimensional marker 21 are respectively set to be points A, B, C, and D. In the marker coordinate system, the points A, B, C, and D are expressed by A=(−0.5, −0.5), B=(−0.5, 0.5), C=(0.5, 0.5), and D=(0.5, −0.5), respectively. The points A, B, C, and D are set to be points A2, B2, C2, and D2 in the captured image.

Figure 16:
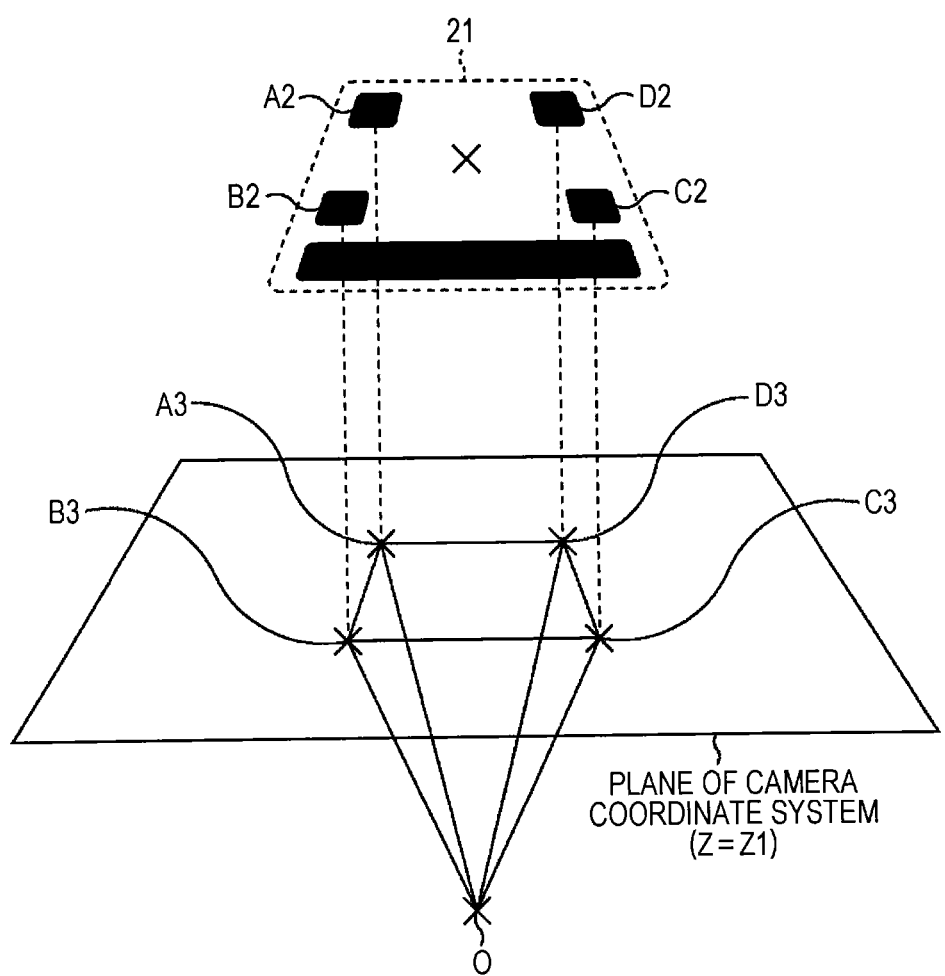
FIG. 16 is a diagram showing an example of a coordinate system according to an embodiment of the present disclosure.

In Step S21, the rotation matrix calculation section 64 defines the plane of Z=Z1 (Z1 is a positive constant) in the camera coordinate system as illustrated in FIG. 16, and projects the points A2, B2, C2, and D2 on the plane. The projected points on the plane are respectively set to be points A3, B3, C3, and D3. With the camera position O and the points A3, B3, C3, and D3, four triangles of ΔOA3B3, OB3C3, OC3D3, and OD3A3 are defined.

In Step S22, the rotation matrix calculation section 64 obtains normal vectors of the defined four triangles through calculation of outer products. The normal vectors of ΔOA3B3, OB3C3, OC3D3, and OD3A3 are respectively set to be Vab, Vbc, Vcd, and Vda.

In Step S23, the rotation matrix calculation section 64 calculates the outer products of Vab×Vcd and Vbc×Vda, and each calculation result is set to be V1 and V2. In addition, the rotation matrix calculation section 64 performs V1×V2, and the calculation result is set to be V3. The vector V3 is the normal vector of the plane ABCD, that is, the Z axis of the marker coordinate system.

In Step S24, the rotation matrix calculation section 64 defines ΔOA3C3 with both ends of the diagonal connecting the camera position O and the points A3 and C3, and defines ΔOB3D3 with both ends of the diagonal connecting the camera position O and the points B3 and D3. In addition, the rotation matrix calculation section 64 obtains the normal vectors of the two defined triangles using outer product calculation, and sets the obtained normal vectors respectively to be Vac and Vbd.

In Step S25, the rotation matrix calculation section 64 calculates the outer products of Vac×V3 and Vbd×V3, and sets the calculation results to be diagonal vectors V4 and V5 respectively.

In Step S26, the rotation matrix calculation section 64 obtains the sum of V4+V5 of the diagonal vectors V4 and V5, and sets the sum to be a vector AB. The vector AB serves as the Y axis of the marker coordinate system.

In Step S27, the rotation matrix calculation section 64 obtains the difference of V4−V5 of the diagonal vectors V4 and V5, and sets the difference to be a vector AD. The vector AD serves as the X axis of the marker coordinate system. Accordingly, each unit vector of each direction of the X, Y, and Z axes of the two-dimensional marker 21 is obtained.

In Step S28, the rotation matrix calculation section 64 sets the unit vectors to be (x1, x2, x3), (y1, y2, y3), and (z1, z2, z3) using the elements of the three directions, and obtains a rotation matrix that is a 4×4 matrix of (1) below. After that, the process returns to Step S6 of FIG. 14, and processes thereafter are performed.

$$\begin{bmatrix} x1 & x2 & x3 & 0 \\ y1 & y2 & y3 & 0 \\ z1 & z2 & z3 & 0 \\ 0 & 0 & 0 & 1 \end{bmatrix} \quad (1)$$

Regarding 4×4 Matrix

The 4×4 matrix obtained as above will be described. The 4×4 matrix is an expression used to indicate rotation and parallel translation (conversion of coordinates) in three-dimensional coordinates.

The process of creating the 4×4 matrix includes three steps as below.

1. Creation of a 3×3 matrix for rotation conversion
2. Creation of a 3×1 matrix for parallel translation
3. Creation of a 4×4 matrix that by combining two matrixes 1. Creation of a 3×3 Matrix for Rotation Conversion If the three-dimensional coordinates are expressed by a 3-row 1-column vector having three components of x, y, and z, the calculation of converting a 3×1 vector before rotation to a 3×1 vector after rotation is expressed by the following equation (2) in which a vector before rotation is multiplied by the right side of a 3×3 matrix.

$$\begin{bmatrix} x' \\ y' \\ z' \end{bmatrix} = \begin{bmatrix} r11 & r12 & r13 \\ r21 & r22 & r23 \\ r31 & r32 & r33 \end{bmatrix} \begin{bmatrix} x \\ y \\ z \end{bmatrix} \quad (2)$$

2. Creation of a 3×1 Matrix for Parallel Translation

Performing parallel translation of a vector having three components of [x' y' z'] is equal to adding a vector of parallel translation components of [x1 y1 z1] thereto. A vector of [x" y" z"] after translation is expressed by the following equation (3).

$$\begin{bmatrix} x'' \\ y'' \\ z'' \end{bmatrix} = \begin{bmatrix} x' \\ y' \\ z' \end{bmatrix} + \begin{bmatrix} x1 \\ y1 \\ z1 \end{bmatrix} \quad (3)$$

3. Creation of a 4×4 Matrix that by Combining Two Matrixes

There is a method for performing rotation conversion and parallel translation with one matrix calculation. By adding a fourth component 1 to the three-dimensional vector, a 4×1 vector of [x y z 1] is created. The 3×3 rotation conversion matrix is substituted for the first to third rows and the first to third columns of a 4×4 matrix, and the parallel translation vector is substituted for the first to third rows and the first to third rows of the fourth column. In the fourth row of the 4×4 matrix, 0 is substituted for the first to third columns, and 1 is substituted for the fourth column. A matrix obtained as a result works as a matrix obtained by rotating the 4×1 vector of [x y z 1] and performs parallel translation so as to be converted to [x" y" z" 1]. The conversion formula to [x" y" z" 1] is as shown in the following equation (4).

$$\begin{bmatrix} x'' \\ y'' \\ z'' \\ 1 \end{bmatrix} = \begin{bmatrix} r11 & r12 & r13 & x1 \\ r21 & r22 & r23 & y1 \\ r31 & r32 & r33 & z1 \\ 0 & 0 & 0 & 1 \end{bmatrix} \begin{bmatrix} x \\ y \\ z \\ 1 \end{bmatrix} \quad (4)$$

Calculation of Rotation Matrix based on Sensor Data

Herein, calculation of a rotation matrix based on sensor data will be described. FIG. 17 is a diagram showing a specific example of the calculation of a rotation matrix based on sensor data and the flow of a drawing using the rotation matrix obtained in the calculation.

Process (1) of FIG. 17 is a process of acquiring a current measured value of the gyro sensor 52. In addition, Process (2) is a process of calculating a 3×3 matrix indicating the current measured value of the gyro sensor 52 and rotation from the previous measured value. The process obtained by combining Processes (1) and (2) corresponds to the processes of Steps S10 and S11 of FIG. 14 described above.

The 3×3 matrix indicating rotation obtained from Process (2) is expressed by following expression (5).

```
typedef struct{ double m11, m12, m13;

double m21, m22, m23;

double m31, m32, m33;

}CMRotationMatrix;                                         (5)
```

Process (3) of FIG. 17 is a process of creating a 4×4 matrix from values of the rotation matrix indicating rotation. The 4×4 matrix obtained from Process (3) is expressed by the following expression (6).

$$\begin{matrix} m11 & m21 & m31 & 0 \\ m12 & m22 & m32 & 0 \\ m13 & m23 & m33 & 0 \\ 0 & 0 & 0 & 1 \end{matrix} \quad (6)$$

Process (4) of FIG. 17 is a process of drawing the 3D object using the 4×4 matrix. Process (4) corresponds to the processes of Steps S7 and S8 performed after the processes of Steps S10 and S11 of FIG. 14.

Modified Example

Switching of the display of the object 31 having the exterior of a digital still camera will be described, but of course, the 3D object displayed when the two-dimensional marker 21 is recognized is not limited to the object having the exterior of a digital still camera.

In addition, sensor data, which is used in correcting the positional relationship between the information processing terminal 1 and the two-dimensional marker 21 after it is no longer able to recognize the two-dimensional marker 21, is set to be an output of the gyro sensor 52, but an output of other sensors such as an acceleration sensor or a geomagnetic sensor may be possible.

A target to be recognized is set to be a two-dimensional marker, but the technology described above can be applied even when another identifier projected over a captured image is recognized and a 3D object corresponding to the recognized identifier is displayed. As targets to be recognized as identifiers, there are the faces of persons, buildings, and the like projected over a captured image, in addition to one-dimensional bar codes.

Conversion of the orientation and the position of a 3D object is set to be performed using a 4×4 matrix, but conversion may be performed using another method if the orientation and the position of the 3D object are changed according to the positional relationship between the information processing terminal 1 and the two-dimensional marker 21 in the method.

Configuration Example of Computer

A series of processes described above can be executed by hardware as well as software. When the series of processes is executed by software, a program constituting the software is installed in a computer incorporated into dedicated hardware, a general-purpose personal computer, or the like from a program recording medium.

FIG. 18 is a block diagram showing a configuration example of hardware of a computer executing the series of processes described above using a program.

A CPU (Central Processing Unit) 101, a ROM (Read Only Memory) 102, and a RAM (Random Access Memory) 103 are connected to one another via a bus 104.

On the bus 104, an input and output interface 105 is further connected. To the input and output interface 105, an input unit 106 including a keyboard, a mouse, and the like, and an output unit 107 including a display, a speaker, and the like are connected. In addition, to the input and output interface 105, a storage unit 108 including a hard disk, a non-volatile memory, and the like, a communication unit 109 including a network interface, and the like, and a drive 110 for driving a removable medium 111 are connected.

In the computer configured as above, the series of processes described above is performed by the CPU 101 loading a program stored in, for example, the storage unit 108 on the RAM 103 via the input and output interface 105 and the bus 104 for execution.

A program executed by the CPU 101 is recorded on, for example, the removable medium 111 or provided through a wired or wireless transmission medium such as a local area network, the Internet, or digital broadcasting, and then installed in the storage unit 108.

The program executed by the computer may be program in which processes are performed in a time series following the order described in the present specification, or may be a program in which processes are performed in parallel or at necessary time points when there is a call-out, or the like.

An embodiment of the present disclosure may not be limited to the above-described embodiments, and can be variously modified in the scope not departing from the gist of the present disclosure.

The present technology can have a configuration of cloud computing in which one function is divided into a plurality of devices through a network, and processed together.

In addition, each of the steps described in the above-described flowcharts can be executed in one device or by being divided into a plurality of devices.

Furthermore, when a plurality of processes are included in one step, the plurality of processes included in the step can be executed in one device or by being divided into a plurality of devices.

Combination Example of Configuration

The present disclosure can have the following configurations.

(1) An information processing terminal which includes a recognition unit that recognizes an identifier projected over an image, an acquisition unit that acquires data of an object corresponding to the identifier, a processing unit that changes the orientation of the object according to the positional relationship between the information processing terminal itself and the identifier specified based on the image, and when it is no longer able to recognize the identifier, changes the orientation of the object according to the positional relationship between the information processing terminal itself and the identifier specified based on sensor data, and a display control unit that causes the object of which the orientation is changed according to the positional relationship between the information processing terminal itself and the identifier to be displayed over the image in a superimposed manner.

(2) The information processing terminal described in (1) above, which further includes a capturing unit, and in which the recognition unit recognizes the identifier projected over the image captured by the capturing unit.

(3) The information processing terminal described in (1) or (2) above, in which the processing unit changes the orientation of the object according to the positional relationship between the information processing terminal itself and the identifier specified based on the sensor data detected at the time when and after the identifier can be last recognized when it is no longer able to recognize the identifier.

(4) The information processing terminal described in any one of (1) to (3) above, which further includes a sensor unit that detects the sensor data.

(5) The information processing terminal described in (4) above, in which the sensor unit includes a gyro sensor.

(6) The information processing terminal described in any one of (1) to (5) above, in which the identifier is a two-dimensional code including regions with different colors.

(7) An information processing method which includes steps of recognizing an identifier projected over an image, acquiring data of an object corresponding to the identifier, changing the orientation of the object according to the positional relationship between the information processing terminal itself and the identifier specified based on the image, and when it is no longer able to recognize the identifier, changing the orientation of the object according to the positional relationship between the information processing terminal itself and the identifier specified based on sensor data, and causing the object of which the orientation is changed according to the positional relationship between the information processing terminal itself and the identifier to be displayed over the image in a superimposed manner.

(8) A program which causes a computer to execute a process including steps of recognizing an identifier projected over an image, acquiring data of an object corresponding to the identifier, changing the orientation of the object according to the positional relationship between the information processing terminal itself and the identifier specified based on the image, and when it is no longer able to recognize the identifier, changing the orientation of the object according to the positional relationship between the information processing terminal itself and the identifier specified based on sensor data, and causing the object of which the orientation is changed according to the positional relationship between the information processing terminal itself and the identifier to be displayed over the image in a superimposed manner.

The present disclosure contains subject matter related to that disclosed in Japanese Priority Patent Application JP 2011-283007 filed in the Japan Patent Office on Dec. 26, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing terminal comprising:
recognition circuitry that recognize an identifier projected over an image;
acquisition circuitry that acquire data of an object corresponding to the identifier;
processing circuitry that change the orientation of the object according to a positional relationship between the information processing terminal itself and the identifier specified based on the image while a position of the information processing terminal is closing into a horizontal plane on which the identifier is placed, and when it is no longer able to recognize the identifier as an angle between the information processing terminal and the horizontal plane reaches a minimum angle beyond which the identifier is not recognizable, changes the orientation of the object according to the positional relationship between the information processing terminal itself and the identifier specified based on sensor data generated from sensor circuitry measuring angular velocity occurring around each axis of X, Y, and Z axes used to define position of the object, wherein the information processing terminal determines a period, during which the angular velocity equals to or higher than a threshold is measured, as the period for performing correction of the positional relationship between the information processing terminal and the identifier by the sensor circuitry; and
display control circuitry that cause the object of which the orientation is changed according to the positional relationship between the information processing terminal itself and the identifier to be displayed over the image in a superimposed manner.

2. The information processing terminal according to claim 1, further comprising:
capturing circuitry,
wherein the recognition circuitry recognize the identifier projected over the image captured by the capturing circuitry.

3. The information processing terminal according to claim 1, wherein the processing circuitry change the orientation of the object according to the positional relationship between the information processing terminal itself and the identifier specified based on the sensor data detected at the time when and after the identifier can be last recognized when it is no longer able to recognize the identifier.

4. The information processing terminal according to claim 1, wherein the sensor circuitry include a gyro sensor.

5. The information processing terminal according to claim 1, wherein the identifier is a two-dimensional code including regions with different colors.

6. An information processing method comprising:
recognizing an identifier projected over an image;
acquiring data of an object corresponding to the identifier;
changing the orientation of the object according to a positional relationship between the information processing terminal itself and the identifier specified based on the image while a position of the information processing terminal is closing into a horizontal plane on which the identifier is placed, and when it is no longer able to recognize the identifier as an angle between the information processing terminal and the horizontal plane reaches a minimum angle beyond which the identifier is not recognizable, changing the orientation of the object according to the positional relationship between the information processing terminal itself and the identifier specified based on sensor data generated from sensor circuitry measuring angular velocity occurring around each axis of X, Y, and Z axes used to define position of the object, wherein the information processing terminal determines a period, during which the angular velocity equals to or higher than a threshold is measured, as the period for performing correction of the positional relationship between the information processing terminal and the identifier by the sensor circuitry; and causing the object of which the orientation is changed according to the positional relationship between the information processing terminal itself and the identifier to be displayed over the image in a superimposed manner.

7. A non-transitory computer readable medium storing a program thereon that, when executed by a computer, causes the computer to perform a process comprising:

recognizing an identifier projected over an image;

acquiring data of an object corresponding to the identifier;

changing the orientation of the object according to a positional relationship between the information processing terminal itself and the identifier specified based on the image while a position of the information processing terminal is closing into a horizontal plane on which the identifier is placed, and when it is no longer able to recognize the identifier as an angle between the information processing terminal and the horizontal plane reaches a minimum angle beyond which the identifier is not recognizable, changing the orientation of the object according to the positional relationship between the information processing terminal itself and the identifier specified based on sensor data generated from sensor circuitry measuring angular velocity occurring around each axis of X, Y, and Z axes used to define position of the object, wherein the information processing terminal determines a period, during which the angular velocity equals to or higher than a threshold is measured, as the period for performing correction of the positional relationship between the information processing terminal and the identifier by the sensor circuitry; and causing the object of which the orientation is changed according to the positional relationship between the information processing terminal itself and the identifier to be displayed over the image in a superimposed manner.

* * * * *